March 20, 1956   C. C. S. LE CLAIR   2,738,902
GREASE GUNS AND LIKE LUBRICANT DISPENSING DEVICES
Filed Aug. 28, 1952   2 Sheets-Sheet 2

Inventor:
Camille Clare Sprankling LeClair
By
Ahlberg, Nupper & Gradolph
Attorneys.

United States Patent Office 2,738,902
Patented Mar. 20, 1956

2,738,902

GREASE GUNS AND LIKE LUBRICANT DISPENSING DEVICES

Camille Clare Sprankling Le Clair, East Toronto, Ontario, Canada, assignor to Tecalemit Limited, Brentford, England Application August 28, 1952, Serial No. 306,765

4 Claims. (Cl. 222—253)

This invention relates to improvements in, or modifications of, the grease gun and like lubricant-dispensing device (hereinafter called a "grease gun") described and claimed in the specification of prior Patent No. 2,526,374.

One constructional form of the grease gun described and claimed in the said specification comprises a barrel or low pressure cylinder, the rear end of which is closed by a screw-on cap. The opposite or front end of the cylinder is closed by a conical mouthpiece, which is shaped and apertured centrally so as to provide a guide for a slidable high pressure cylinder.

The said barrel or cylinder encloses a hollow low pressure piston member which is pressure die-cast and comprises a piston part which is slidable in the barrel or cylinder and a sleeve part of reduced diameter which is integral with the piston part. At its end remote from the piston part the sleeve part is flanged inwards so as to provide an axial bore in which the said high pressure piston is slidable. Both the flange of the sleeve part and the piston part are formed with annular grooves for the reception of sealing members. The annular groove in the piston part, which faces outwardly is die-cast, but the annular groove in the said flange, which faces inwardly, is machined, this being the only part of the piston member which is machined.

The piston part of the low pressure piston is also formed with four equidistantly-spaced castellations separated by four gaps. Each of the castellations is formed with a circumferential groove and all four grooves are in alignment with each other.

The hollow high pressure cylinder is formed with transverse grease inlet ports, which, when the cylinder is in its working position, are disposed within the sleeve part of the low pressure piston at the back of the flanged end of the latter. Close to, and at the rear of, the ports the high pressure cylinder is provided with a shoulder which, in a preferred form consists of a collar fixed in an annular groove in the cylinder.

The rear end of the grease-ejecting, or high pressure piston, which is constructed to slide in the bore of the high pressure cylinder, is die-cast into a boss provided centrally in a cap member formed with four equidistantly-spaced lugs which are of such a width that they will fit within the gaps between the four castellations in the piston part of the low pressure piston member. The back faces of these four lugs upon the cap member constitute four rectangular shoulders which, when the lugs on the cap member are fitted in the gaps and are in contact with the bottoms thereof, are flush with the front faces of the grooves in the castellations.

Around the said boss of the said cap member in which the end of the piston is die-cast, the cap member is formed with a number of ports through which the grease can make its way from the space between the low pressure piston and the rear cap on the said barrel or cylinder into the interior of the sleeve part of the piston.

The outlet end of the high pressure cylinder is fitted with a non-return, discharge valve and with a nozzle, which is adapted to form grease-tight engagement with nipples or other lubricant-receiving devices.

In contradistinction to the above prior arrangement, however, the present invention provides a grease gun comprising a grease-containing low pressure cylinder, a combined low pressure and high pressure piston assembly which includes a low pressure piston part slidable in the low pressure cylinder and a hollow sleeve part, the interior of which communicates through the piston part with the interior of the low pressure cylinder, a high pressure cylinder the end of which extends slidably into and communicates with the interior of the sleeve part and which has an enlarged head which is slidable in the sleeve part so as to form therein a supplementary low pressure piston, a discharge conduit connected with and leading from the high pressure cylinder for the discharge of grease therefrom, a non-return valve between the high pressure cylinder and the discharge conduit and a high pressure piston forming part of the said assembly, the arrangement being such that when the discharge conduit is applied to a grease nipple and pressure is applied to the gun, the high pressure cylinder is forced inwardly over the high pressure piston to effect a discharge stroke during which substantially the full length of the high pressure cylinder as far as the non-return valve is swept by the high pressure piston, whereas when the pressure on the gun is released to produce a suction stroke between the high pressure cylinder and piston, the movement of the enlarged piston head in the sleeve produces a suction action which assists in drawing grease from the low pressure cylinder into the sleeve.

One of the advantages of this construction is that the grease gun can be more readily primed when relatively stiff or viscous greases or lubricants are being used in the gun, since, for one thing, the enlarged head which is provided on the high pressure cylinder and which forms the said supplementary low pressure piston produces an increased suction action which materially assists in drawing the grease into the interior of the sleeve, preparatory to its being drawn into the high pressure cylinder.

A further feature of the present invention consists in arranging a non-return valve between the contiguous ends of the bore of the high pressure cylinder and a discharge conduit instead of at the front end of the high pressure cylinder as in the case of the grease gun of the said Patent No. 2,526,374. By this arrangement, when the high pressure piston carries out its discharge stroke it sweeps through the whole volume of the bore of the high pressure cylinder as far as the non-return valve, so that the swept volume is equal to the total volume of the bore of the high pressure cylinder. This ensures that the maximum possible vacuum is created in the high pressure cylinder when the high pressure piston is at the end of its suction stroke.

According to a further feature of the present invention, the suction stroke of the high pressure piston is carried out under the action of a spring which is arranged externally of, and not within, the said sleeve part of the low pressure piston.

Further constructional features of the invention will be described hereinafter.

Three constructional forms of the invention are hereinafter described, by way of example, with reference to the accompanying drawings wherein.

Figure 1:
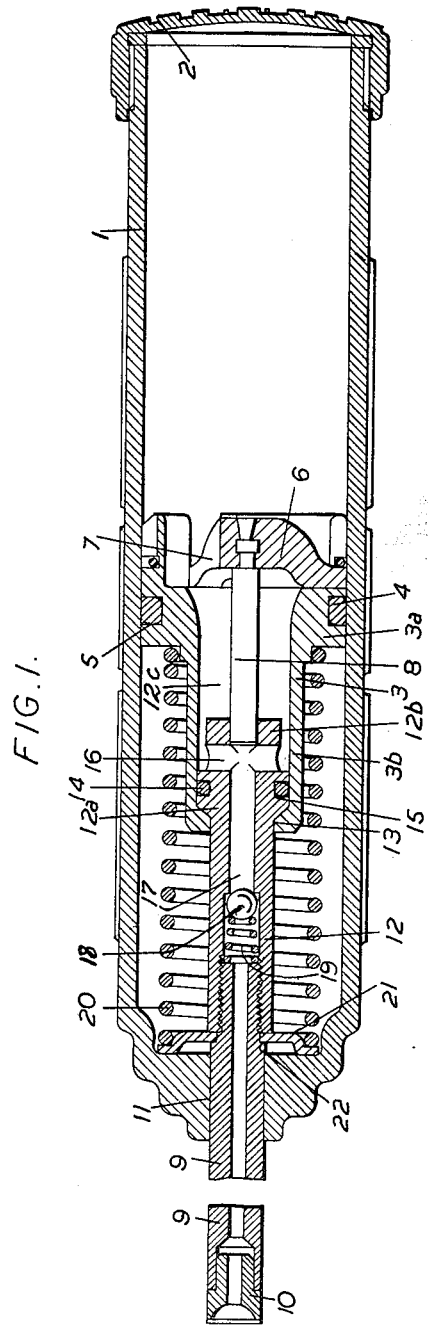
Fig. 1 is a longitudinal section of one construction in which the grease inlet end of the low pressure piston is fitted with an apertured detachable cap but in which the low pressure cylinder or barrel is made in the form of a one-piece unit.

Referring first to Fig. 1:

The constructional form of grease gun shown in this figure comprises a one-piece barrel or low-pressure cylinder 1, the rear end of which is closed by a screw-threaded cap 2. The hollow low-pressure piston 3 comprises a piston part 3a which is slidable in the low pressure cylinder and a sleeve 3b which is of less diameter. A cylindrical section or O sealing ring 4 is arranged in an annular groove 5 formed in the piston part. As in the grease gun described and claimed in the said patent, a cap 6 formed with grease inlet ports 7 is detachably fixed in the end of the piston part 3a remote from the sleeve and the rear end of the high pressure piston 8 is die-cast in the cap.

A discharge conduit 9, the front end of which is fitted with a nozzle 10 adapted to form a lubricant-tight seal with a nipple (not shown) is slidably arranged in a guide hole 11 formed in the front end of the barrel. The rear end of the discharge conduit is screwed into the front end of the bore of the high pressure cylinder 12, which latter is slidably guided in an apertured inturned flange 13 formed at the front end of the sleeve 3b. The high pressure cylinder 12 is formed with an enlarged part or piston part 12a which is slidably arranged in the bore of the sleeve and, in order to prevent leakage of the low pressure grease entering the sleeve along the piston part of the high pressure cylinder, a cylindrical section or O sealing ring 14 is arranged in an annular groove 15 in the piston part.

At the rear of the piston part 12a of the high pressure cylinder the latter is formed with a part 12b of reduced diameter provided with transverse grease inlet ports 16 which provide communication between the interior of the sleeve 3b and the bore of the high pressure cylinder. When the grease gun is not in operation the front end of the high pressure piston 8 is engaged in the bore 17 of the high pressure cylinder at the rear of the transverse grease inlet ports 16 in the cylinder. The front end of the bore of the high pressure cylinder is normally closed by a ball-type non-return valve 18, which is urged upon its seat by a spring 19 reacting between the rear end of the discharge conduit 9 and the valve.

The high pressure cylinder 12 and the discharge conduit 9 are normally urged into their rest positions, in which the front end of the high pressure piston 8 is engaged in the bore of the high pressure cylinder at the rear of the grease inlet ports 16 therein, by means of a coil spring 20 which surrounds the sleeve 3b and the part of the high pressure cylinder projecting therefrom and reacts between a washer 21 mounted between a shoulder 22 on the discharge conduit and the front end of the high pressure cylinder and the front face of the piston part 3a of the low pressure piston.

When the grease gun is to be used and the part of the barrel or low pressure cylinder 1 at the rear of the low pressure piston 3a and the sleeve 3b has been charged with grease, the nozzle 10 at the front end of the discharge conduit is applied to a nipple and the barrel is pushed towards the nipple. The barrel thus slides relatively to the low pressure piston 3a and grease is forced through the transverse ports 16 in the high pressure cylinder 12 into the bore of the latter. The discharge conduit 9 and the high pressure cylinder 12 move rearwards and the high pressure piston 8 first closes the transverse grease inlet ports 16 and then expels the grease from the bore of the high pressure cylinder past the non-return valve 18. When the thrust on the gun barrel is relieved the lubricant discharge conduit 9 and the high pressure cylinder 12 are returned to their rest positions by their spring 20 and during this movement the transverse inlet ports 16 are again uncovered and grease is drawn through the ports into the bore of the high pressure cylinder, this suction effect being assisted by the secondary low pressure piston part 12a of the high pressure cylinder because the suction action of the piston part 12a has drawn grease into the space 12c preparatory to its entry into the high pressure cylinder 12 via the ports.

Figure 2:
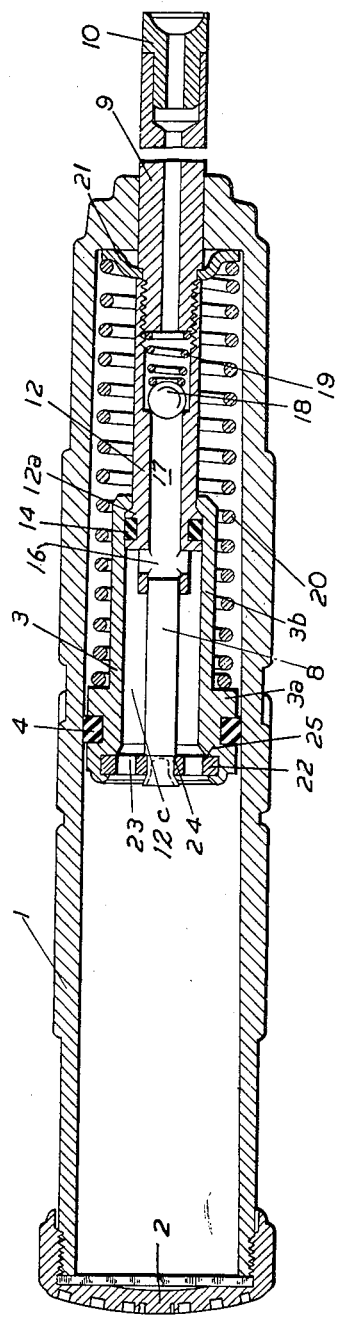
Fig. 2 is a longitudinal elevation of a modification in which the grease inlet end of the low pressure piston is fitted with a detachable apertured disc.

In the modified construction shown in Figure 2, the grease gun is constructed substantially like the grease gun described above. In the modified construction, however, the apertured cap 6, which in the above construction is detachably attached to the low pressure piston 3 in the same manner as the cap of the grease gun described in the said prior patent is replaced by a disc 22 which is formed with a number of grease inlet ports 23 arranged around a central hole 24 in which the rear end of the high pressure piston 8 is fixed. The front face of the disc 22 fits against a shoulder 25 formed near the rear end of the low pressure piston 3 and the rear end of the piston part 3a is spun over so as to fix the disc between the spun-over part and the shoulder.

Figure 3:
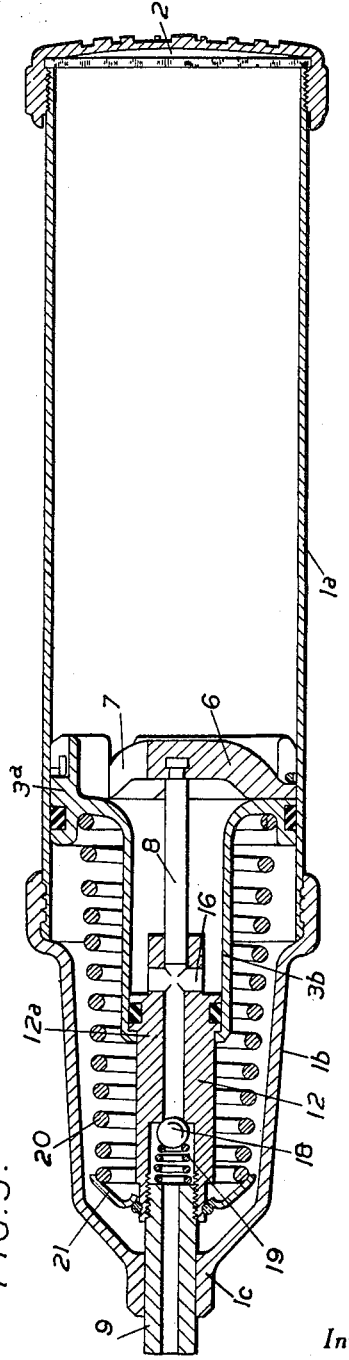
Fig. 3 is a longitudinal elevation of a further modification in which the barrel or low pressure cylinder is made in two detachable parts.

In the further modification shown in Fig. 3, the grease gun is constructed substantially in the same way as the first construction described above except that the barrel is made in two parts. The front end 1a of the barrel is screwed into the rear end of the front part 1b of the barrel and the front part is of conical section and at its front end is formed with a boss 1c formed with a central hole in which the lubricant discharge conduit 9 is slidable.

I claim:

1. A grease gun comprising a grease-containing low pressure cylinder, a combined low pressure and high pressure piston assembly which includes a low pressure piston part slidable in the low pressure cylinder and a hollow sleeve part, the interior of which communicates through the piston part with the interior of the low pressure cylinder, a high pressure cylinder the end of which extends slidably into and communicates with the interior of the sleeve part and which has an enlarged head which is slidable in the sleeve part so as to form therein a supplementary low pressure piston, a transverse inlet port formed in said high pressure cylinder between the enlarged head thereof and the said end thereof, a discharge conduit connected with and leading from the high pressure cylinder for the discharge of grease therefrom, a non-return valve between the high pressure cylinder and the discharge conduit and a high pressure piston forming part of the said assembly, the arrangement being such that when the discharge conduit is applied to a grease nipple and pressure is applied to the gun, the high pressure cylinder is forced inwardly over the high pressure piston to effect a discharge stroke, whereas when the pressure on the gun is released to produce a suction stroke between the high pressure cylinder and piston, the movement of the enlarged piston head in the sleeve produces a suction action which assists in drawing grease from the low pressure cylinder into the sleeve.

2. A grease gun comprising a grease-containing low pressure cylinder, a combined low pressure and high pressure piston assembly which includes a low pressure piston part slidable in the low pressure cylinder and a hollow sleeve part, the interior of which communicates through the piston part with the interior of the low pressure cylinder, a high pressure cylinder the end of which extends slidably into and communicates with the interior of the sleeve part and which has an enlarged head which is slidable in the sleeve part so as to form therein a supplementary low pressure piston, a transverse inlet port formed in said high pressure cylinder between the enlarged head thereof and the said end thereof, a discharge conduit connected with and leading from the high pressure cylinder for the discharge of grease therefrom, a non-return valve between the high pressure cylinder and the discharge conduit and a high pressure piston forming part of the said assembly, the high pressure cylinder portion between the transverse port and the adjacent end thereof acting as a guide bearing for the high pressure piston, the arrangement being such that when the discharge conduit is applied to a grease nipple and pressure is applied to the gun, the high pressure cylinder is forced inwardly over the high pressure piston to effect a discharge stroke during which substantially the full length of the high pressure cylinder as far as the non-return valve is swept by the high pressure piston, whereas when the pressure on the gun is released to produce a suction stroke between the high pressure cylinder and piston, the movement of the enlarged piston head in the sleeve produces a suction action which assists in drawing grease from the low pressure cylinder into the sleeve.

3. A grease gun as claimed in claim 1, wherein the suction stroke of the high pressure piston is carried out under the action of a spring which is arranged externally of the high pressure cylinder and of the sleeve part of the said assembly.

4. A grease gun as claimed in claim 3, wherein the said spring reacts between the piston part of the assembly and an abutment provided on the discharge conduit.

References Cited in the file of this patent

UNITED STATES PATENTS

| | | |
|---|---|---|
| 1,587,292 | Fesler | June 1, 1926 |
| 1,703,285 | Zerk | Feb. 26, 1929 |
| 1,723,253 | Piquerez | Aug. 6, 1929 |
| 2,526,374 | Le Clair | Oct. 17, 1950 |